United States Patent
Prellwitz et al.

[15] 3,635,082
[45] Jan. 18, 1972

[54] APPARATUS FOR MEASURING MASS FLOW OF FLUIDBORNE SOLIDS

[72] Inventors: Samuel B. Prellwitz, Pittsburgh; Joseph Pysnik, Monroeville, both of Pa.

[73] Assignee: United States Steel Corporation

[22] Filed: Apr. 23, 1969

[21] Appl. No.: 818,527

[52] U.S. Cl. ..............................73/194 M, 73/194 E, 73/28, 73/61 R, 235/151.34, 324/61
[51] Int. Cl. .......................................................G01g 11/06
[58] Field of Search ........................324/61, 65; 235/151.34; 73/194, 28, 32, 434, 61 R, 432 PS

[56] References Cited

UNITED STATES PATENTS

| | | | |
|---|---|---|---|
| 2,491,445 | 12/1949 | Cunningham et al.....................73/194 |
| 2,861,425 | 11/1958 | Morgan ..................................73/194 |
| 3,025,464 | 3/1962 | Bond................................73/194 UX |

FOREIGN PATENTS OR APPLICATIONS

| | | | |
|---|---|---|---|
| 512,388 | 1/1955 | Italy..........................................73/194 |
| 1,014,939 | 12/1965 | Great Britain...........................73/194 |
| 1,294,051 | 4/1969 | Germany..................................73/194 |

OTHER PUBLICATIONS

Goldman, H. B. et al. Flow Monitor RCA Technical Note: 697 Jan. 1967

Primary Examiner—Richard C. Queisser
Assistant Examiner—Marvin Smellar
Attorney—Rea C. Helm

[57] ABSTRACT

Finely divided particles in a fluid stream transported in a conduit comprise the dielectric of two spaced-apart capacitors at electrically insulated inserts in the conduit. Circuitry determines the time span between correlated variations in capacitance of the two capacitors as a measure of stream velocity. Additional circuitry determines stream density by measuring the capacitance. The velocity and density circuit outputs are multiplied to provide a mass flow rate. An integrator provides total flow.

8 Claims, 7 Drawing Figures

INVENTORS.
SAMUEL B. PRELLWITZ &
JOSEPH PYSNIK

By Rea C. Helm

Attorney

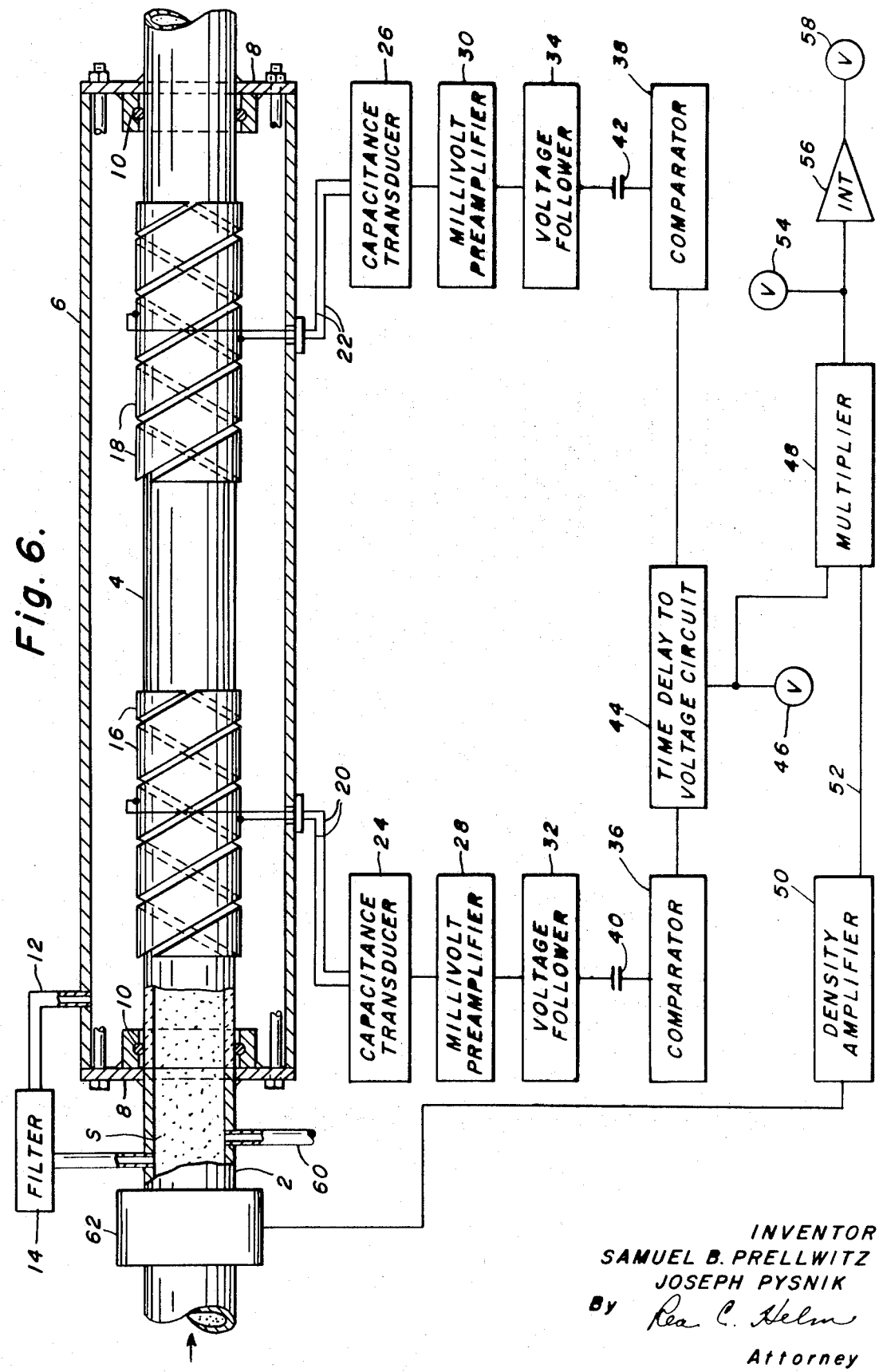

APPARATUS FOR MEASURING MASS FLOW OF FLUIDBORNE SOLIDS

This invention relates to apparatus for measuring the flow of finely divided solids transported in a fluid stream carried through a conduit or pipe, and more particularly to the transportation of solids such as coal or iron ore in a fluid stream of compressed air, oxygen or other suitable gas in a metallurgical or industrial process.

In order to determine the quantity of the solids transported, some measurement of the solids suspended in the gaseous medium is required. Preweighed material or metered mechanical feeders have severe limitations. Commercial-type flowmeters have projections in the flow pipe that may obstruct the flow pipe by buildup or may be abraded away. Other commercially available flowmeters may be unsatisfactory because they require that the fluid be electrically conductive, or require conduit elbows or bends which are subject to abrasion.

It is therefore an object of our invention to provide an apparatus for measuring mass flow of fluidborne solids without obstructing the flow of solids.

Another object is to provide an apparatus for measuring the flow without changing the direction of the flow.

Still another object is to provide an apparatus which can measure the flow of any type of solid particle.

A further object is to provide an apparatus which is independent of the velocity and density of the conveying medium.

These and other objects will become more apparent after referring to the following specification and attached drawings, in which:

FIG. 6 is a schematic diagram showing details of alternative embodiments of the flowmeter.

Figure 1:
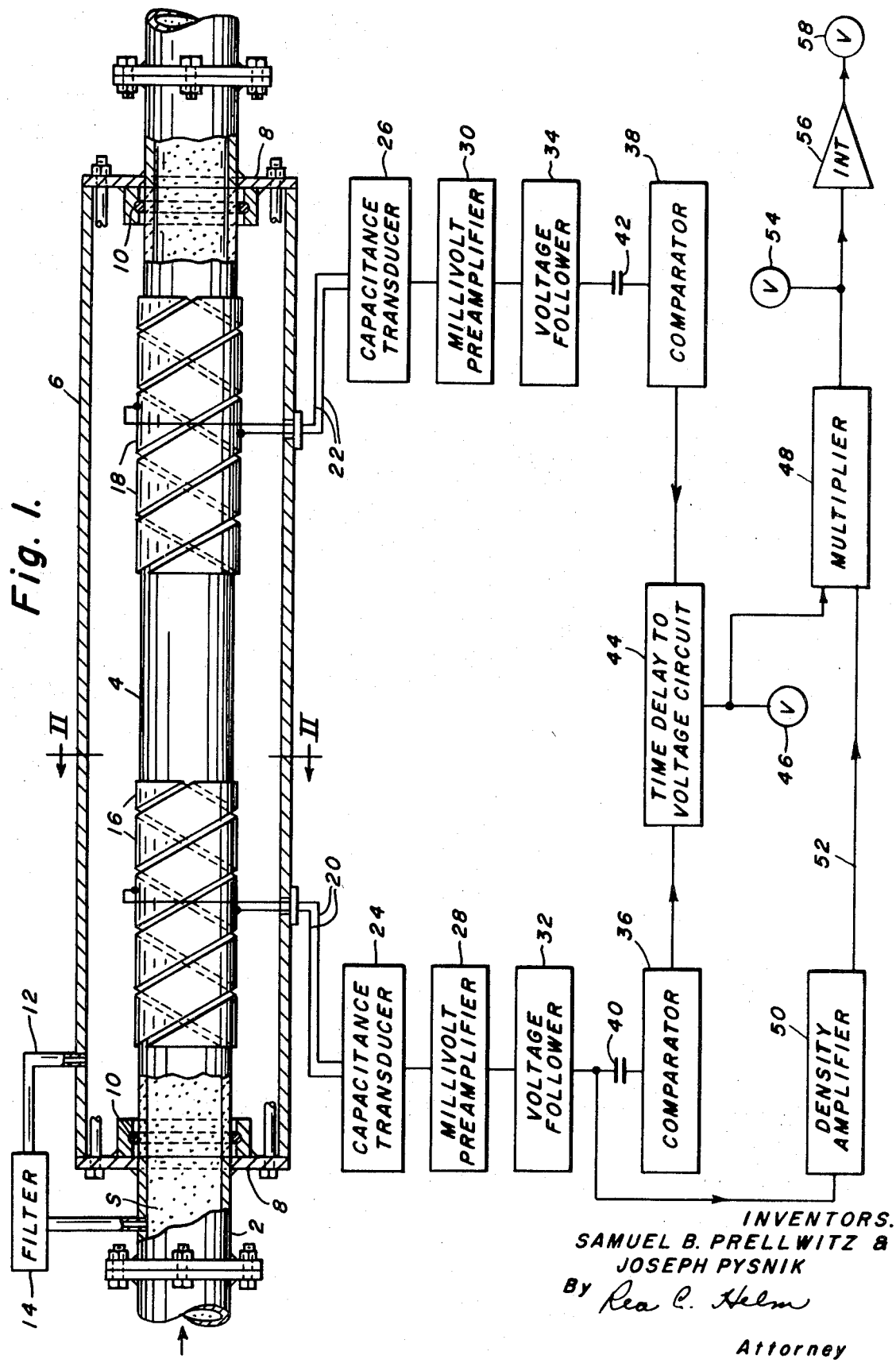
FIG. 1 is a schematic view of the measuring capacitors and their relation to the transporting duct together with the measuring components of the flowmeter.
Figure 2:
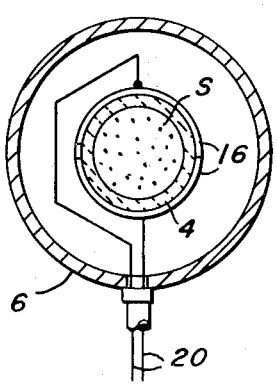
FIG. 2 is a sectional view taken on line II—II of FIG. 1.

Referring now to FIG. 1, reference numeral 2 indicates a conduit through which a fluidborne solid S passes. A section of this conduit has been replaced by a nonmetallic conduit 4, made from a ceramic material such as porcelain. The inside diameter of the conduit 2, and the nonmetallic section 4 are the same so that the piping provides a smooth bore through the flowmeter. The nonmetallic section 4 is entirely surrounded by a metallic shield 6 that provides protection and support. Shield 6 is fitted with flanges 8 at either end which couples conduit 2 to shield 6. An O-ring 10, connected inside the shield 6, holds the nonmetallic section 4 in place. A pressure equalization line 12, which reduces the stresses on the nonmetallic tube 4, connects conduit 2 with the inside of shield 6 through a filter 14. Mounted on the exterior of nonmetallic conduit 4 is an upstream set of parallel-spiraled capacitor plates 16 and a downstream set of spiraled capacitor plates 18. The plates of capacitors 16 and 18 are connected to coaxial cables 20 and 22, respectively.

Coaxial cables 20 and 22 connect capacitors 16 and 18 to capacitance transducers 24 and 26, respectively. Transducers 24 and 26 are identical and each may be a C-line unit Model 201 manufactured by Lyon Research Corporation, Cambridge, Mass. Transducers 24 and 26 are connected to preamplifiers 28 and 30 which are identical and each may be a Model 19-101A manufactured by Consolidated Electrodynamics Corporation, Bridgeport, Conn., who also manufactured the components with identifying model numbers that follow. Preamplifiers 28 and 30 are connected to voltage followers 32 and 34, respectively, which are identical and each may be a Model 19-105-1. Voltage followers 32 and 34 are connected to comparators 36 and 38 through coupling capacitors 40 and 42, respectively. Comparators 36 and 38 may each be one-half of a Model 19-501-2 comparator. The outputs of comparators 36 and 38 are connected to a time delay to voltage circuit 44 which may be the type disclosed in Pysnik application, No. 792,935, filed Jan. 22, 1969. The output of circuit 44 is connected to a voltmeter 46 and a multiplier 48 such as a Model 19-309.

The output of voltage follower 32 is also connected to a density amplifier 50 which may be a Model 19-101A. The output 52 of amplifier 50 is connected to multiplier 48. The output of multiplier 48 is connected to a voltmeter 54 and integrator 56 which may be a Model 19-407. The output of integrator 56 is connected to a voltmeter 58.

Figure 4A:
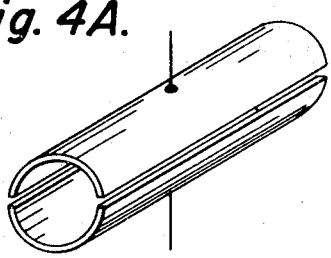
FIGS. 4A and 4B are perspective views of two styles of capacitors.
Figure 4B:
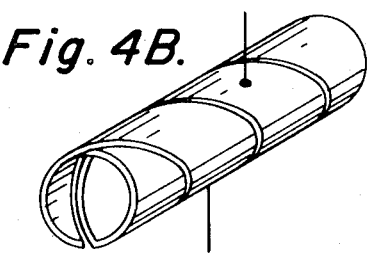
Figure 5:
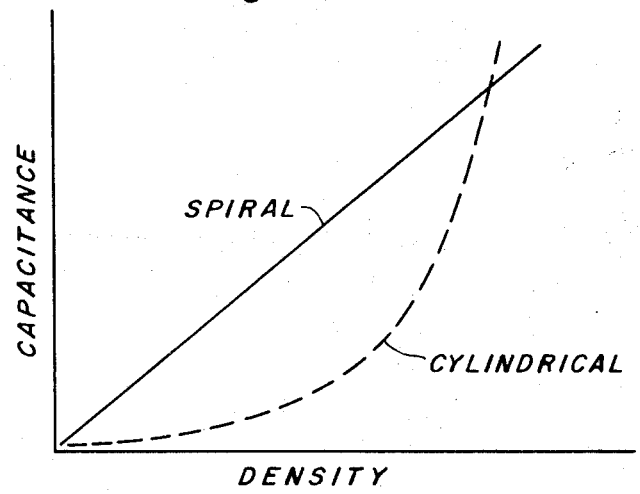
FIG. 5 is a graph illustrating the density-capacitance characteristics of the two styles of capacitors.

The capacitance of a simple capacitor consisting of two parallel conductive plates depends on the dielectric constant of the material between the plates. If the material is air, a certain capacitance exists which changes if some other material is mixed with the air. Thus, the addition of granules of material to the air will change the dielectric constant and the capacitance can then be used as a measure of the amount of granules in the air between the plates, assuming that the granules are of the same homogeneous material. An undesirable nonlinear relationship between capacitance and the amount of granules in a duct exists when the capacitor plates are cylindrical sections around a duct as shown in FIG. 4A, but if the capacitor plates are narrow spiraled ribbons as shown in FIG. 4B, a linear relationship exists as shown in FIG. 5. The capacitance of spiral capacitors 16 and 18 indicates the density of the material in the conduit 12. Transducers 24 and 26 energize capacitors 16 and 18 and each produces a voltage proportional to the capacitance of the capacitor to which it is connected. This voltage is then a measure of the density of the material in the duct. The output of voltage follower 32 is used as the density voltage.

When solid granules of material are transported through conduit 2 by pneumatic means, the flow is not uniform, but varies from very dense areas where the pipe volume is nearly filled, sometimes called slugs, to areas between slugs where the pipe volume is nearly empty. Since the capacitance of capacitors 16 and 18 will change when slugs pass, if the two capacitors are placed a fixed distance apart, the time difference between voltage fluctuations from the separate transducers 24 and 26 will be a measure of the velocity of the slug, or of the material in the duct.

Figure 3:
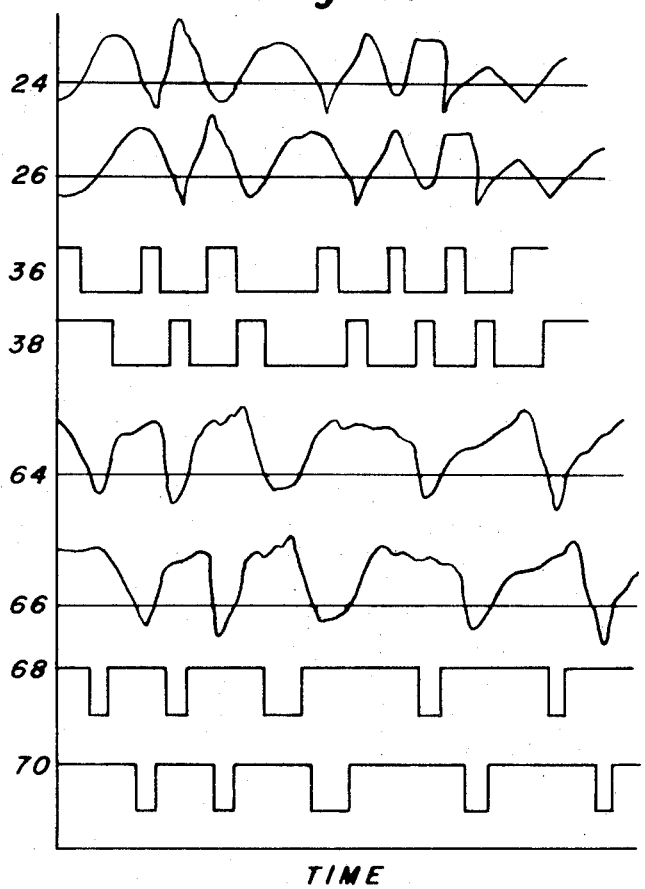
FIG. 3 is a series of waveforms drawn to a common time scale illustrating the operation of the flowmeter.

FIG. 3 illustrates the pattern of voltage fluctuations from transducers 24 and 26 as material flows through duct 2. Waveform 24 is the waveform from transducer 24 and waveform 26 is from transducer 26. An irregular random waveform occurs with several fairly tall spikes corresponding to slugs of materials in the duct 2. Waveforms 24 and 26 are very similar, and are displaced from each other by the time required for a slug to pass from capacitor 16 to capacitor 18.

The output of transducers 24 and 26 are amplified by amplifiers 28 and 30, respectively. Voltage followers 32 and 34 increase the current capabilities of amplifiers 28 and 30.

The outputs of transducers 24 and 26 have a large direct current voltage pedestal on which the small variations are based. Coupling capacitors 40 and 42 block the direct current voltage and allow only the variations to reach comparators 36 and 38. The coupling capacitors also allow the direct current variations to have positive and negative values and thus allow for zero crossovers. Comparators 36 and 38 are high-gain amplifiers without feedback and with a reference voltage connected to ground which produces wave shapes 36 and 38 of FIG. 3, as wave shapes 24 and 26 cross the zero line. The outputs of comparators 36 and 38 are connected to circuit 44 which produces a voltage proportional to the time delay between waveforms 36 and 38 as determined by the zero crossover method. When divided by the distance separating capacitors 16 and 18, this voltage becomes voltage 46 and represents the feet per second flow of material through duct 2.

The output of voltage follower 32 is amplified in amplifier 50 to provide a voltage input representative of the density of material between the plates of capacitor 16 in pounds per cubic foot. When divided by the cross-sectional areas of duct 2, at capacitor 16, this voltage becomes voltage 52 representing pounds per foot density and this voltage is connected to multiplier 48.

Multiplier 48 multiplies voltage 52 and voltage 46 to provide an output voltage 54 representing the velocity of material through duct 2 in pounds per second. Integrator 56 integrates voltage 54 during any desired timespan to provide a voltage output 58 representing total flow in pounds.

In the embodiments shown in FIG. 6, the construction and operation are generally the same as in FIG. 1, except that a line 60 is connected to duct 2 to inject quantities of the carrier fluid into conduit 2, and a nuclear density gage 62, mounted on conduit 2, provides the density signal for amplifier 50.

When there is a high ratio of the gaseous carrying medium to the solids transported, a relatively smooth or steady flow exists and slugs are not present. The voltage output of transducers 24 and 26 is then too steady to provide an adequate number of zero crossovers so that the voltage 46 cannot be accurately developed. However, if voids are introduced into the duct 2, the dips in the voltage output of transducers 24 and 26 can be used in the same manner as the spikes created by slugs. Voids can be introduced into the duct 2 by suddenly admitting a quantity of the compressed gaseous medium, for example, compressed air, into the duct through line 60. As the void passes capacitor 16, the output of transducer 24 will dip and as the void passes capacitor 18, the output of transducer 26 will dip as shown by waveforms 64 and 66 in FIG. 3. Comparators 36 and 38 are then set for a different level of zero crossovers to detect the well-defined valleys of waveforms 64 and 66. This provides waveforms 68 and 70 which are similar to waveforms 36 and 38. The remainder of the flowmeter operates in the manner already described.

Because moisture may be transported along with the solids and thus affect the density measurements of capacitor 16, an alternate density determination is provided as shown in FIG. 6. Upstream from capacitor 18 is a nuclear density gage 62, such as a Model PGV, manufactured by the Ohmart Company. The output of gage 62 is connected to the density amplifier 50. The output of density amplifier 50 is then connected to multiplier 48 and used in the manner already described.

While several embodiments of our invention have been shown and described, it will be apparent that other adaptations and modifications may be made.

We claim:

1. Apparatus for measuring the flow of finely divided particles transported in varying density through a conduit in a fluid stream comprising a first detector at a first location on the conduit for detecting variations in particle density, a second detector at a second location on the conduit spaced apart and downstream from the first detector for detecting variations in particle density, means connected to the detectors and responsive to variations in particle density for measuring particle velocity by determining the time delay between the detection of correlated variations in particle density at the first detector and at the second detector, means for measuring particle density in the conduit, and means combining said velocity-measuring means and said density-measuring means for indicating mass flow rate of particles in said conduit.

2. Apparatus according to claim 1 in which said first detector includes a first capacitor with plates arranged on the outside of the conduit so that the amount of particles in the conduit effects the dielectric constant of the capacitor, a first capacitance transducer connected to said capacitor for providing a first electrical output proportional to the capacitance of the first capacitor, a first coupling capacitor connected to the first transducer for passing only variations in the first electrical output, and said second detector includes a second capacitor with plates arranged on the outside of the conduit so that the amount of particles in the conduit effects the dielectric constant at the capacitor, said second capacitor having the same characteristics as the first capacitor, a second capacitance transducer connected to said second capacitor for providing a second electrical output proportional to the capacitance of the second capacitor, said second capacitance transducer having the same characteristics as said first capacitance transducer, and a second coupling capacitor connected to the second transducer for passing only variations in the second electrical output.

3. Apparatus according to claim 1 in which the means for measuring particle density in the conduit is a nuclear density gage.

4. Apparatus according to claim 1 which includes means for periodically injecting increments of fluid into the conduit upstream from the first detector thereby providing turbulence in the fluid flow and assuring variations in particle mass flow.

5. Apparatus according to claim 2 in which the means for measuring the particle velocity includes a first comparator connected to the first coupling capacitor, thereby enabling the comparator to compare variations in the first electrical output with a predetermined level and to change state whenever the level of the variations in the first electrical output changes from one side of the predetermined level to the other side of the predetermined level, a second comparator connected to the second coupling capacitor and having the same characteristics as the first comparator, means for converting the time delay between correlated changes in the output states of the comparators to a voltage thereby providing a measure of average particle velocity between detectors, and a first voltmeter connected to the output of the converting means.

6. Apparatus according to claim 5 in which the means for combining said velocity-measuring means and said density-measuring means for indicating mass flow rate includes an amplifier connected to the first transducer, a multiplier connected to the amplifier output and the output of the converting means for multiplying the output of the amplifier by the output of the converting means thereby providing a voltage proportional to the rate of mass flow of the particles, and means for indicating the mass flow rate connected to the multiplier output.

7. Apparatus according to claim 6 including an integrator connected to the output of the multiplier, and means connected to the output of the integrator for indicating total mass flow.

8. Apparatus according to claim 6 in which the conduit is a round tube composed of electrical insulating material at the detector locations, and the plates of the first and second capacitor are each in the shape of narrow spaced-apart parallel ribbons disposed in a spiral configuration around the conduit with the flat side of each ribbon next to the outside of the conduit.

* * * * *

UNITED STATES PATENT OFFICE
CERTIFICATE OF CORRECTION

Patent No. 3,635,082    Dated January 18, 1972

Inventor(s) Samuel B. Prellwitz et al

It is certified that error appears in the above-identified patent and that said Letters Patent are hereby corrected as shown below:

On the cover sheet [56] in the References Cited, "2,861,425" should read -- 2,861,452 --. Column 2, line 28, "12" should read -- 2 --; line 73, "input" should read -- output --.

Signed and sealed this 7th day of November 1972.

(SEAL)
Attest:

EDWARD M. FLETCHER, JR.          ROBERT GOTTSCHALK
Attesting Officer                Commissioner of Patents